United States Patent
Lane et al.

(10) Patent No.: US 10,162,313 B2
(45) Date of Patent: Dec. 25, 2018

(54) EQUIPMENT ISOLATION SYSTEM

(71) Applicant: Remsafe Pty Ltd, Balcatta Western Australia (AU)

(72) Inventors: Michael Charles Lane, Dianella (AU); Jack Mross, Fremantle (AU)

(73) Assignee: REMSAFE PTY LTD., Balcatta (AU)

(*) Notice: Subject to any disclaimer, the term of this patent is extended or adjusted under 35 U.S.C. 154(b) by 261 days.

(21) Appl. No.: 15/199,187

(22) Filed: Jun. 30, 2016

(65) Prior Publication Data

US 2017/0003661 A1    Jan. 5, 2017

(51) Int. Cl.
G05B 9/02    (2006.01)

(52) U.S. Cl.
CPC ...... *G05B 9/02* (2013.01); *G05B 2219/24154* (2013.01); *Y02P 90/10* (2015.11)

(58) Field of Classification Search
CPC ........................................................ G05B 9/02
USPC .......................................................... 700/292
See application file for complete search history.

(56) References Cited

U.S. PATENT DOCUMENTS

| | | |
|---|---|---|
| 2,166,061 A | 8/1937 | Kirk |
| 4,210,788 A | 7/1980 | Stranczek |
| 4,863,006 A | 9/1989 | Kotkata et al. |
| 6,442,452 B1 | 8/2002 | Kopke |
| 6,537,797 B1 | 3/2003 | Picardal et al. |
| 6,892,115 B2 | 5/2005 | Berkcan et al. |
| 7,151,329 B2 | 12/2006 | Andarawis et al. |
| 7,311,247 B1 | 12/2007 | Lenner |
| 7,340,311 B2 | 3/2008 | Landis et al. |
| 7,716,489 B1 | 5/2010 | Brandt et al. |

(Continued)

FOREIGN PATENT DOCUMENTS

| | | |
|---|---|---|
| AU | 2014100216 | 4/2014 |
| CN | 201376581 | 1/2010 |

(Continued)

OTHER PUBLICATIONS

Montague, Jim, "Mining, Minerals and Cement Forum: A Rich Vein of Automation Innovation," Control—Promoting Excellence in Process Automation, http://www.controlglobal.com/articles/2014/automation-fair-25, Nov. 21, 2014.

(Continued)

*Primary Examiner* — Hien D Khuu
(74) *Attorney, Agent, or Firm* — Cislo & Thomas, LLP

(57) ABSTRACT

An equipment isolation system (10) for remotely isolating equipment (20, 21, 210, 250) in a plant comprising equipment (20, 21, 210, 250) energisable by an energy source and a control system (50) for controlling operation of said equipment (20, 21, 210, 250) and isolation of said equipment from said energy source to an isolated state by an operator, wherein said control system (50, 260, 700) includes an identification device (790) for an operator to provide operator identification data; and a processor for comparing said operator identification data with stored identification data (261) for operators authorised to use the equipment isolation system (10) wherein said control system (50, 260, 700) is configured to enable use of the equipment isolation system (10) by said operator only where the processor matches operator identification data provided to the identification device (790) and said stored identification data (261).

34 Claims, 16 Drawing Sheets

(56) References Cited

U.S. PATENT DOCUMENTS

| | | | |
|---|---|---|---|
| 7,793,774 | B2 | 10/2010 | Cole et al. |
| 8,364,292 | B2 | 1/2013 | Ebner |
| 2003/0000358 | A1 | 1/2003 | Harris et al. |
| 2003/0014779 | A1 | 1/2003 | Drotning |
| 2005/0190056 | A1 | 9/2005 | Lacy et al. |
| 2005/0253689 | A1 | 11/2005 | Mollet et al. |
| 2007/0055888 | A1* | 3/2007 | Miller ............... G06F 21/32 713/186 |
| 2008/0078658 | A1 | 4/2008 | Poyner et al. |
| 2008/0190749 | A1 | 8/2008 | Poyner et al. |
| 2009/0140856 | A1 | 6/2009 | George et al. |
| 2010/0030345 | A1 | 2/2010 | Cole et al. |
| 2010/0085153 | A1 | 4/2010 | Smith |
| 2013/0083805 | A1 | 4/2013 | Lu et al. |
| 2013/0146427 | A1 | 6/2013 | Greirson |
| 2013/0307694 | A1 | 11/2013 | Amar |
| 2014/0111303 | A1 | 4/2014 | Scharnick |
| 2014/0176303 | A1 | 6/2014 | Stratton et al. |
| 2014/0283008 | A1 | 9/2014 | Daino et al. |
| 2015/0091485 | A1 | 4/2015 | Lemberg et al. |
| 2015/0108840 | A1 | 4/2015 | Lane et al. |

FOREIGN PATENT DOCUMENTS

| | | | |
|---|---|---|---|
| CN | 203027378 | | 6/2013 |
| EP | 0400264 | | 12/1990 |
| EP | 0553885 | | 8/1993 |
| EP | 1502893 | | 2/2005 |
| EP | 1821264 | | 8/2007 |
| EP | 2367190 | | 9/2011 |
| EP | 2637068 | | 9/2013 |
| EP | 2842149 | | 3/2015 |
| GB | 263960 | | 1/1927 |
| JP | H06144764 | | 5/1994 |
| WO | WO 2011/031410 | | 3/2011 |
| WO | WO 2011/047428 | | 4/2011 |
| WO | WO 2012/142674 | * | 10/2012 ........... G04B 19/418 |
| WO | WO 2013/160275 | | 10/2013 |

OTHER PUBLICATIONS

Ampcontrol, Inc., "Remote Isolation Increasing Personnel Safety and System Productivity," Nov. 2014.

Lane Mike, "Remote isolation of fixed plant using the innovative, safe and fast REMSAFE" ICM Technologies, Jul. 17, 2012.

Rockwell Automation Inc, ,"Adjustable Frequency AC Drives," Powerflex 4M Technical Data, 22F-TD001B-EN-P, literature. rockwellautomation.com/idc/groups/literature/documents/td/22ftd001_en_p.pdf, 1-20, Jun. 2013.

Rockwell Automation Inc, "Powerflex 20-HIM-A6 and 20-HIM-C6S HIM (Human Interface Model)," User Manual, rockwellautomation.com/idc/groups/literature/documents/um/20him-um001_-en-p.pdf, 1-74, Feb. 2013.

Rockwell Automation, "Protective Measures and Complementary Equipment—Trapped Key Interlocks" web.archive.org/web/20150315070238/http://www.ab.com/en/epub/catalogs/3377539/5666177/3378076/7131359/Trapped-Key-Interlocks.html, 1-1-1-78, Mar. 15, 2015.

Allen Bradley, "Prosafe Trapped Key Systems—Easy Selection Guide," http://www.nhp.com.au/files/editor_upload/File/Brochures/Business-Specific/easyselectionguides/NHPNTUPROTRAPABESG.pdf, 1-12, Feb. 2015.

* cited by examiner

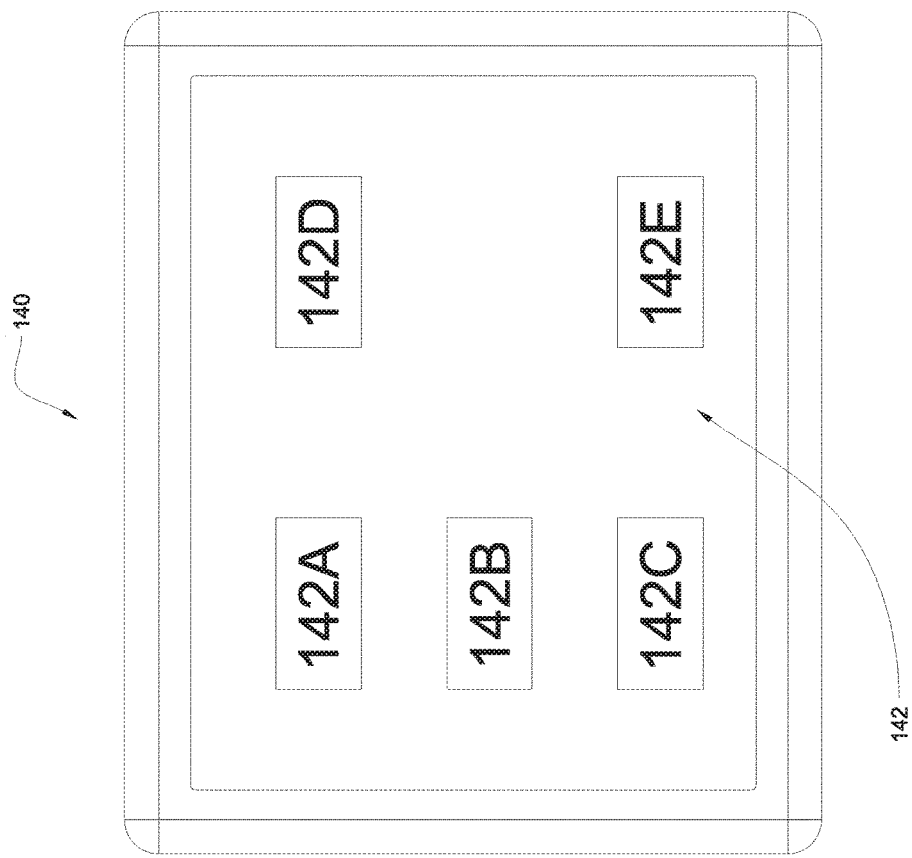

EQUIPMENT ISOLATION SYSTEM

This invention relates to an equipment isolation system for remotely isolating equipment from an energy source.

Various types of equipment must be isolated from a range of energy sources including electrical energy (the most common) and mechanical energy including pressure and potential energy to enable safe maintenance and other work to be carried out. Conveyor belt systems used in the mining industry for transporting iron ore or other bulk materials which can span significant distances are one such example of equipment which may require being isolated from time to time.

The distances such conveyor belt systems can span can be in the range of many kilometres. Such conveyors are typically powered by electric drive motors: three phase electrical power is supplied wherein the voltage may range from low voltage ranges (from below 600V to 1000V AC), to medium and high voltage ranges (in the multiple kV range and extending to above 10 kV AC and even 33 kV AC). Such conveyors typically include brake systems which are also electrically operated.

Although different mine procedures and relevant safety standards may apply, a typical pre-requisite before permitting mechanical maintenance or other activity involving access to the conveyor belt system involves the electrical isolation of the conveyor belt system. This isolation ensures that the energy source powering the conveyor belts and associated equipment, i.e. electrical power, is not just switched off but removed from systems that—if energised—could cause a safety hazard. It will, however, be understood that equipment items other than conveyor belt systems also require isolation for maintenance and other purposes.

The isolation process is safety critical and at the core of providing a safe system of work during maintenance and has, in the past, been time consuming, as described for example in the introduction to the Applicant's granted Australian Patent No. 2010310881 and International Publication No. WO 2012/142674, the contents of which are hereby incorporated herein by way of reference.

The remote isolation system described in Australian Patent No. 2010310881 enables equipment isolation to be requested at a remote isolation station associated with the equipment and subsequently approved through a plant control system, without mandatory visitation to the equipment by authorised isolation personnel. This remote isolation system significantly reduces time for achieving safe isolation, especially production downtime which can be very costly.

Equipment isolation in an industrial plant, being safety critical, is typically the subject of detailed procedures. Such procedures are necessary because of the innately hazardous nature of much plant equipment as well as its complexity. Such detailed procedures usually contain rules on the following subjects:
  personnel authorised to isolate particular equipment (noting that a group of people may need to be involved in an isolation);
  permission to work in particular areas;
  the order in which equipment items are to be isolated and other steps required in the isolation process; and
  the issuing of authorisations and permits.

The procedures often rely on handwritten or printed materials which take significant time to issue for each isolation task. Such procedures typically stipulate that operators are only authorised to use or isolate specific equipment in accordance with their skill set, designated duties, authorised work date and time, authorised work area, works to be performed on equipment, hours worked, training and other permissives. Such authorisation, through issue of isolation permits, may involve complex and essentially manual administrative systems which are often time consuming and may still be bypassed due to error or omissions. That is, despite these detailed procedures, unauthorised isolations may sometimes be requested and even implemented without the requisite authority, especially in cases of emergency.

The present invention has an object of addressing such problems in equipment isolation systems.

With this object in view, the present invention provides an equipment isolation system for remotely isolating equipment in a plant comprising:
  equipment energisable by an energy source; and
  a control system for controlling operation of said equipment and isolation of said equipment from said energy source to an isolated state by an operator,
  wherein said control system includes an identification device for an operator to provide operator identification data; and a processor for comparing said operator identification data with stored identification data for operators authorised to use the equipment isolation system wherein said control system is configured to enable use of the equipment isolation system by said operator only where the processor matches operator identification data provided to the identification device and said stored identification data. This allows verification of the operators identity and authority to use the isolation system and can be understood as a pre-approval for isolation to be requested and effected, preferably through an isolation process configured for, and customised to, a particular operator using devices as described below.

The identification device may take a number of possible forms. The identification device could, for example, be:
  a keypad for inserting personal identification information (numeric, alpha-numeric or otherwise) for an operator;
  a card reader which reads operator identification data from contact or contactless smart cards; and/or
  a biometric device which may include a camera and processor for operator facial, iris or retinal recognition, or a finger print pad and processor for operator fingerprint identification.

Operator identification data may, as alluded to above, be provided directly to the operator identification device or by bringing an operator identification means into communication with the operator identification device. Operator identification means may comprise a range of devices including smart devices such as smart cards and smart phones. Other devices for communicating operator identification data to the operator identification device may be used. All such devices may also function as a plant access means required for an operator to access a plant or work area. These devices may also advantageously be configured with data and rules governing a particular isolation process.

A combination of identification devices and operator identification means could also be used to assure higher security for the equipment isolation system. For example, an operator may be required to successfully pass a card scan and input both personal identification information or biometric data before being authorised to access and use the equipment isolation system.

The equipment isolation system may minimise risk of documentation errors and misuse, for example, by only allowing specific authorised operators to isolate specific equipment or to only allow specific operators to isolate specific equipment for specific tasks, in a specific order and/or even at specific dates and times. In any case, the control system may issue identification data to operators, such identification corresponding with the authority, typically in form of an isolation work permit, to be given to the operator in line with the above considerations. To this end, the control system conveniently includes a database with a record for storing permit data for each operator. This record may be updated with permit data that authorises an operator to perform particular tasks taking permissives such as those described above into account. An operator may be provided with a device, such as a smart card, containing identification and isolation work permit data as downloaded from the control system database or the permit data may be tied to the operator's biometric data. Such isolation work permit data may be verified by the identification device or checked in the field by personnel with suitable identification devices.

If an operator fails to demonstrate requisite authority, for example by inputting incorrect or unauthorised identification data to the identification device, the equipment isolation system may sense and flag this, issuing an alert signal and enabling an opportunity for correction, for example by control room, plant security or supervision/management. Situations may arise where an operator, once authorised, has had that authority withdrawn. Such situations may be handled in the same manner as if unauthorised identification data had been input to the identification device.

Smart devices are configured and programmed with operator identification data using a conventional programming process, preferably in a pre-configuration step prior to an isolation process. Such electronic pre-configuration may have a significant impact on time and money in terms of reducing the administrative burden in comparison to setting isolation permits corresponding to particular operators and tasks using a physical/paper system.

Smart devices may conveniently be provided with other functionality and may also include appropriate communications equipment to store and transmit plant and other relevant data (including operator tracking (e.g. by GPS), reports, alarms and so on). Interfacing with plant control system including its messaging systems (by text, voice message or otherwise) is also possible.

Where smart cards are used (which can be conveniently standard production smart cards), operator identification data is stored in smart card memory and also in a memory of the control system conveniently in the form of the operator database described above using conventional processes in a convenient and flexible pre-configuration step that stores data and rules governing an isolation process as operator identification data on smart cards prior to isolation. In particular, such smart cards carry the isolation permits for a given operator. Isolation permits for an operator can also be tied to that operators biometric data. Smart cards may be assigned to operator(s) being pre-configured for specific tasks, dates and times or permanently assigned with isolation permit data being updated when required.

The control system typically includes, or interfaces with, a plant control system which, when provided with operator identification data such as the above described isolation permits, may check and confirm an operator authority including an operator authority selected from the group consisting of an operator is authorised to effect an isolation for the equipment, an operator has the correct isolation permit(s) and an operator has authority to access or depart from a work area or plant site. The control system may also track operator location through a locating device on the operator identification means to ensure operators are working in the correct area.

The equipment isolation system may advantageously include the Applicant's remote isolation systems with a control system that authorises isolation on permissible request lodged by an operator at a remote isolation station. One or a plurality of such remote isolation stations for selected equipment to be isolated may be provided. Such remote isolation stations are in communication with the control system to enable isolation on permissible request. Such remote isolation stations are provided with control panels having input means, such as a Human Machine Interface (HMI), for the operator request. Such remote isolation station, and conveniently the Human Machine Interface, would conveniently include the operator identification device described above so that the operator must demonstrate authority through appropriate identification data input to the identification device before proceeding further to actually use the equipment isolation system. Mobile isolation stations are described in the Applicant's Australian Provisional Patent Application Nos. 2015902561 and 2015902562 each filed on 30 Jun. 2015, the contents of which are hereby incorporated herein by way of reference. Remote isolation stations may be fixed or mobile or a combination of the two types depending on specific applications.

Such remote isolation stations typically include an equipment isolation switch for use in isolating equipment, the switch being movable between a first energised or de-isolated position in which said equipment item is energised by an energy source and a second isolated position in which the equipment is de-energised and isolated from the energy source. Such equipment isolation switch may advantageously be operated only where an operator has input authorised identification data in the form of data or rules governing a specific isolation process to the operator identification device. Where a plurality of operators are involved, the switch is desirably movable between the first and second positions only where a plurality of operators have input authorised identification data in the form of data or rules governing a specific isolation process to said operator identification device using their operator identification means, for example a pre-configured smart device such as a smart card. The switch must be locked to complete isolation or unlocked during de-isolation, a personal padlock (whether alone or affixed to a hasp which is connected to the switch) currently being used for the purpose. A number of personal locks may be applied by different operators involved in an isolation process. For example, an equipment isolation switch may be configured with an electro-mechanical lock operable only where each concerned operator (as a plurality of operators may work on or during an isolation process) has input authorised identification data to the identification device, for example using a card reader, keypad or both, as described above. Such an electro-mechanical lock may also obviate need for a padlock or hasp for locking out and, in doing so, increase safety by minimising unauthorised operation of such devices which currently occurs on occasion.

Though such pre-configuration of smart devices, such as smart cards, is highly advantageous and preferred, isolations may be configured to the same effect at a remote isolation station using smart devices such as smart cards. Authority to perform such configuration may be limited to more senior operators and managers. Such configuration might be under-taken, for example, when the system is in configurable isolation mode as described below.

The control system can control, and record details of, the operator(s) equipment isolation switch operation, for example locking out using operator identification means, such as smart cards, including name, date and time. A similar procedure would be followed on de-isolation. De-isolation may again require the concerned operator(s) to present valid identification data to the control system using the identification device as a pre-condition to de-isolation.

The equipment isolation system may provide for a plurality of available isolation modes configured for the particular remote isolation system, as described in the Applicant's Australian Provisional Patent Application No. 2015902558 filed on 30 Jun. 2015 the contents of which are hereby incorporated herein by way of reference, and having respective isolation demand inputs. In such case, the control system may enable an operator to select particular modes of isolation (and perform corresponding tasks) only if the operator identification data matches with authority to select that mode of isolation.

A configurable isolation mode may be included as an available isolation mode and advantageously applied to isolate a selected sub-set of equipment items from a set of equipment items which together comprise the plant or a plant system. The sub-set could include one equipment item. In such a case, the control system includes, for example at a remote isolation station, a selecting means for selecting a sub-set of equipment items for isolation as an isolation demand input. The selecting means may enable an operator to select, subject to authority verified by the identification device, a sub-set of equipment items to be isolated while leaving other equipment items operating.

Alternatively, or additionally, the control system may select the sub-set of equipment items for isolation in an automated process depending on other commands input to the control system. Such an isolation mode may enable isolation of all equipment items in the plant for a maintenance shutdown. At the same time, or more preferably prior to the isolation time to save time and avoid deficiencies of the manual system, operator records in the control system database described above are updated with permit data authorising them to perform tasks in line with permissives such as those described above. Such updating may be done by personnel supervising the isolation or automatically by the control system using historical operator permit data for specific tasks. Such permit data may be downloaded to an operator device such as a smart card or tied to biometric data to be verified by identification device(s) as described above.

Where a plurality of operators are required to work on the equipment items in such configurable isolation mode for example, the control system pre-configures a plurality of operator identification means with data and rules governing isolation and operation of equipment items within said sub-set of equipment items. The control system may pre-configure each operator identification means with the same or different data and rules governing isolation and operation of equipment items dependent on tasks that each operator has to perform during isolation.

The isolation system may enable equipment isolation through a wireless communications network including mobile isolation devices for requesting the control system to authorise equipment isolation. Such a remote isolation system is described in the Applicant's Australian Provisional Patent Application No. 2015902562 filed on 30 Jun. 2015, the contents of which are hereby incorporated herein by way of reference. In such case, the mobile isolation devices may include the operator identification device as described above.

The remote isolation system may include features to prevent an operator leaving equipment in an isolated state by mistake. For example, an operator who has isolated some equipment and locked out, for example using a personal lock may attempt to leave the equipment area or even the site without removing their personal lock. This may cause significant problems and consequences for both operator and plant owner. To this end, the control system may monitor operator activity, for example by tracking the operator identification means, and trigger an alert if it detects and flags that an operator has failed to de-isolate equipment when safe to do so. One alert condition could be an attempt by an operator to depart from the work area or plant site without having de-isolated equipment when safe to do so This may also be addressed by making operator departure from a particular area or site conditional on presenting operator identification means to an operator identification device located at any access means to the work area or plant site which, on communicating with the control system, may alert the operator that removal of the personal lock is required. Access means to the site, such as an automatically operated door or gate, may fail to operate in case of such an alert.

The equipment remote isolation system may be retrofitted to existing equipment and plant in a range of industries, for example the materials handling and mining industries. The remote isolation system may also advantageously be used for isolating rail system components in railway infrastructure.

The term "isolation" as used in this specification is to be understood in its maintenance engineering and legal sense as not simply turning off a supply of energy to equipment, whatever the nature of that energy, but removing and/or dissipating energy to provide a safe work environment as required by applicable occupational health and safety regulations. In the case of electricity, as just one example, isolation is not achieved simply by turning off a power supply to the equipment. In such cases, the equipment could accidentally re-start or be restarted and cause injury to personnel, or worse. Isolation instead prevents such accidental re-starting and typically will also involve processes to dissipate any hazardous stored energy, in whatever form that energy may take (e.g. potential energy), from the equipment. For example, such an additional energy dissipation step could be effected in respect of a conveyor belt system by way of the braking cycle procedure as described in the Applicant's Australian Provisional Patent Application No. 2015902565, the contents of which are incorporated herein by way of reference.

The equipment remote isolation system of the present invention may be more fully understood from the following description of preferred embodiments made with reference to the following drawings in which:

FIG. 16 shows a schematic display screen for a control panel located in a control room for the equipment isolation system schematised in FIG. 11.

Figure 1:
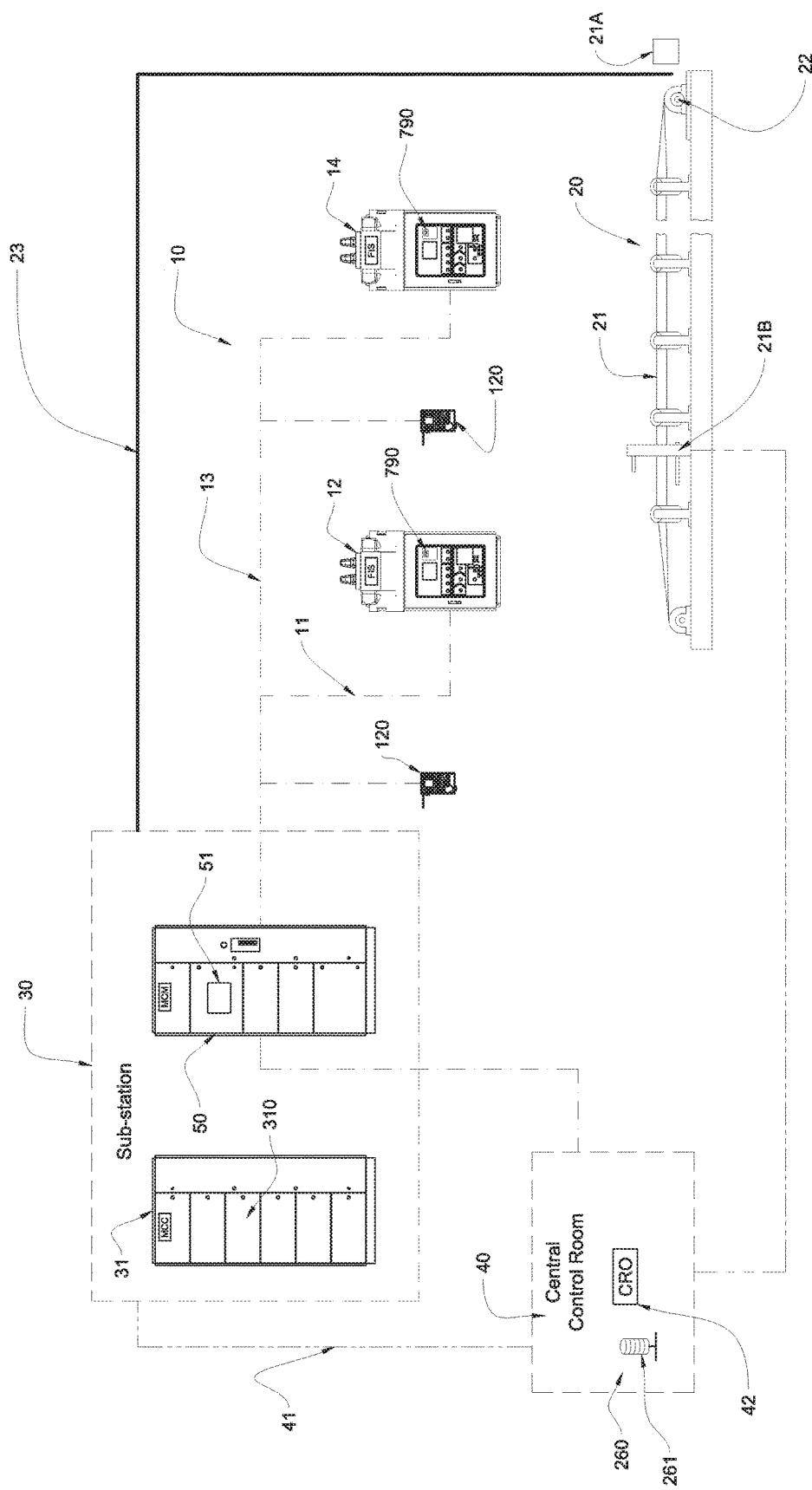
FIG. 1 shows a schematic layout of an equipment isolation system as applied to a conveyor belt system and configured in accordance with one embodiment of the present invention.

Referring to FIG. 1, there is shown a schematic layout of a remote equipment isolation system 10, as retrofitted on to an existing conveyor belt system 20, for example a long range conveyor belt system for conveying iron ore. The conveyor belt system 20 comprises a troughed conveyor belt 21 having a head pulley drive motor 22 driven by an electrical supply emanating from electrical contacts 31, whether provided as contactors or circuit breakers. The head pulley drive motor 22 is powered through a variable speed drive (VSD) which is electrically powered from a three phase AC power supply line 23 providing voltage of less than 1000V AC. Conveyor belt 21 is provided with an electrically powered braking system 21A and a Tramp Metal Detector (TMD) 21B for detecting metallic debris if present on the conveyor belt 21.

Electrical power for conveyor belt system 20 is supplied from a sub-station 30. The sub-station 30 houses the contacts 31. Activation of the contacts 31 (i.e. placing them in the "off" or "break" state), de-energises all three phases of the electrical supply to the conveyor head pulley drive motor 22. Activation of similar contacts 310 also housed within the sub-station 30 similarly de-energises all three phases of the electrical supply to the conveyor braking system 21A. Such de-energisation is continuously monitored by respective voltage monitor relays (not shown) located downstream of contacts 31, i.e. on the conveyor belt system 20 and conveyor braking system 21A side of the contacts 31 and 310 respectively.

The conveyor belt system 20 and sub-station 30 are under the control and supervision of a plant control system 260 having a Central Control Room (CCR) 40, via a DCS (Distributed Control System), a PLC (Programmable Logic Controller) and a SCADA (Supervisory Control and Data Acquisition System) as are commonly used and would be well understood by the skilled person. Item 41 in FIG. 1 is representative of a communication and control network between the CCR 40 and various other plant systems and components. A Control Room Operator (CRO) 42 is located within the CCR 40 and has various input/output (I/O) devices and displays available (not shown) for the proper supervision and control of the conveyor belt system 20. Except for the equipment isolation system 10, the above description represents what may be considered a conventional system in the materials handling and mining industries.

The equipment isolation system 10 comprises fixed position equipment isolation stations 12 and 14 which are located proximate to the conveyor belt system 20. Equipment isolation stations 12 and 14 could be replaced or supplemented by one or more mobile isolation devices 120, one form of which is described in further detail below. Mobile isolation stations are also disclosed in the Applicant's Provisional Patent Application Nos, 2015902561 and 2015902562 filed on 30 Jun. 2015, the contents of which are hereby incorporated herein by way of reference. The equipment isolation stations 12 and 14 may be powered from the plant grid, other power networks or alternative power sources, conveniently such as solar power.

Mobile isolation devices 120, unlike fixed equipment isolation stations 12 and 14, can be used anywhere around the plant providing significant flexibility and reducing the need to spend time travelling to and fro between fixed equipment isolation stations 12 and 14 for communications tasks and maintenance tasks in a work area of the conveyor belt system 20. This should reduce downtime and increase productivity without compromising safety. It will be understood that equipment isolation system 10 could altogether dispense with fixed equipment isolation stations in favour of mobile isolation devices 120 in certain applications.

The equipment isolation system 10 also includes a master controller 50 incorporating a HMI in the form of a touch sensitive screen 51 which displays human interpretable information. The master controller 50 is also located within sub-station 30.

Equipment isolation stations 12 and 14 and mobile isolation devices 120 communicate with master controller 50 and each other via wireless communication channels 11 and 13 respectively. The communication channels 11 and 13 form part of a wireless communications network for controlling the conveyor belt system 20 so saving costs and difficulty involved with installing fibre optic or other cable as described hereinbefore.

The wireless communications network used in the control of conveyor belt system 20 requires a communication protocol to work effectively. This communication protocol is selected for ready interoperability with other plant components making maintenance and trouble shooting requirements easier. That is, the communication protocol is open, not closed. Plant personnel are not precluded from refining the communication protocol or left susceptible to system failures that only a third party to the plant operator/owner can address.

In this case, the communication protocol involves an industrial communication protocol. Communications relating to remote isolation must be via safety rated communications protocol software such as Interbus Safety or PROFIsafe which are Safety Integrity Level (SIL) rated and well known software applications within the mining and materials handling industries. This will ensure that the communication channels are monitored and diagnostic tools are available for fault control and rectification when required.

Further description of the electrical layout and operation of the remote isolation system 10 is provided in the Applicant's Australian Patent No. 2010310881, the contents of which have been incorporated by reference. Advantageously, the remote isolation system 10 includes securing means for continuously monitoring and maintaining isolation integrity as described in the Applicant's Provisional Patent Application No. 2015902556 filed 30 Jun. 2015, the contents of which are hereby incorporated herein by way of reference.

Figure 2:
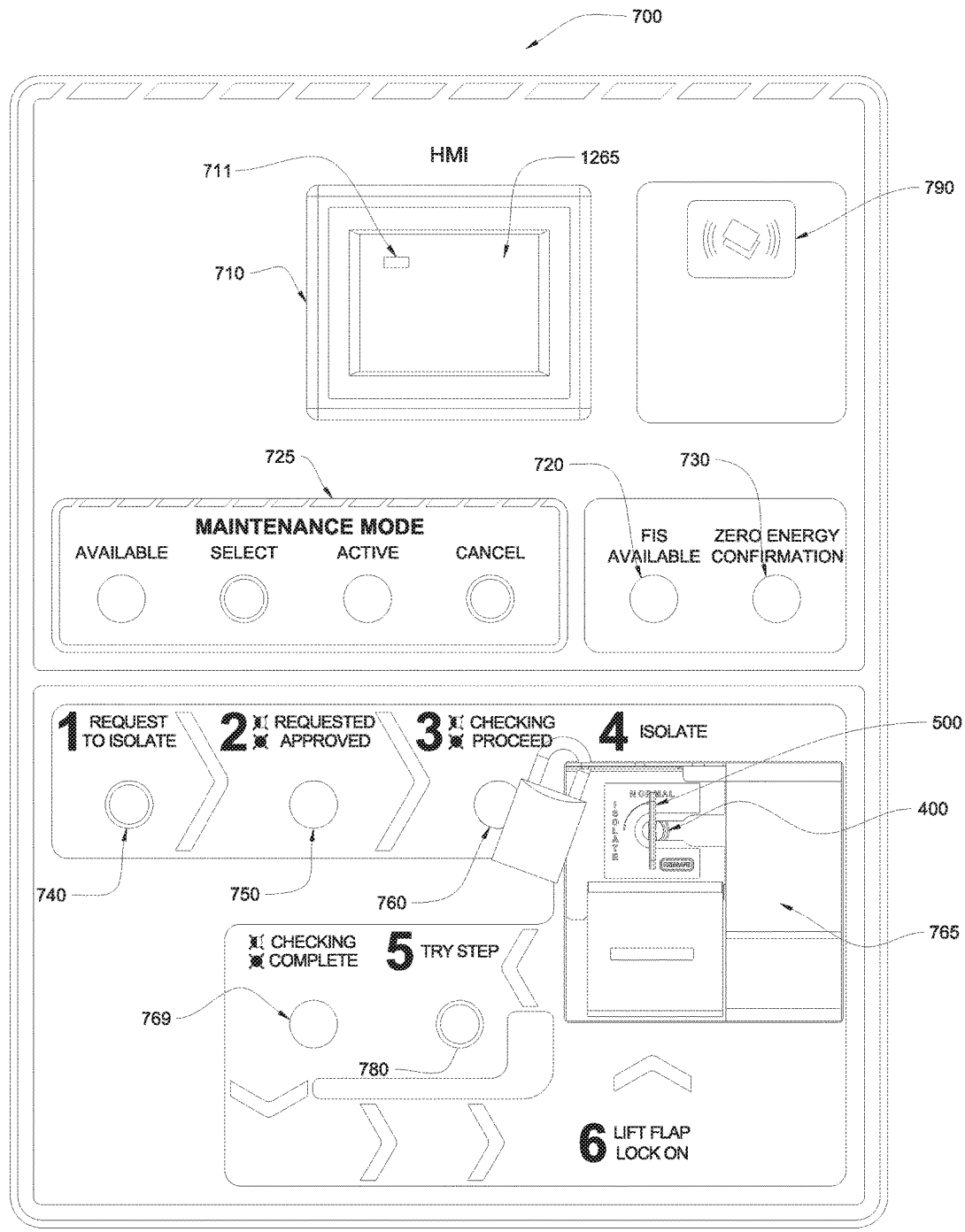
FIG. 2 shows a schematic of a control panel for a fixed equipment isolation station used in the equipment isolation system schematised in FIG. 1.

FIG. 2 shows a schematic of a control panel 700 arranged as part of each equipment isolation station 12 and 14 for implementing the Applicant's remote isolation system 10. Further detail of each equipment isolation station 12 and 14 is provided below. Control panel 700 has a human machine interface (HMI) 710 with a touch screen 1265 (though less fragile buttons, switches and other input devices may be used in alternative arrangements) for entering commands (including isolation demand inputs in the form of operator initiated isolation requests). Information about such isolation requests including isolation status and other plant data can also be presented on screen 1265.

HMI 710 enables the operator to request isolation of equipment within conveyor belt system 20 following verification of operator authority to isolate using a smart card reader 790 incorporated in control panel 700. Smart card reader 790 is of conventional form with an RF modem, powered by low voltage electricity supply, for communicating with smart cards 770 (as will be described further hereinafter).

Figure 12:
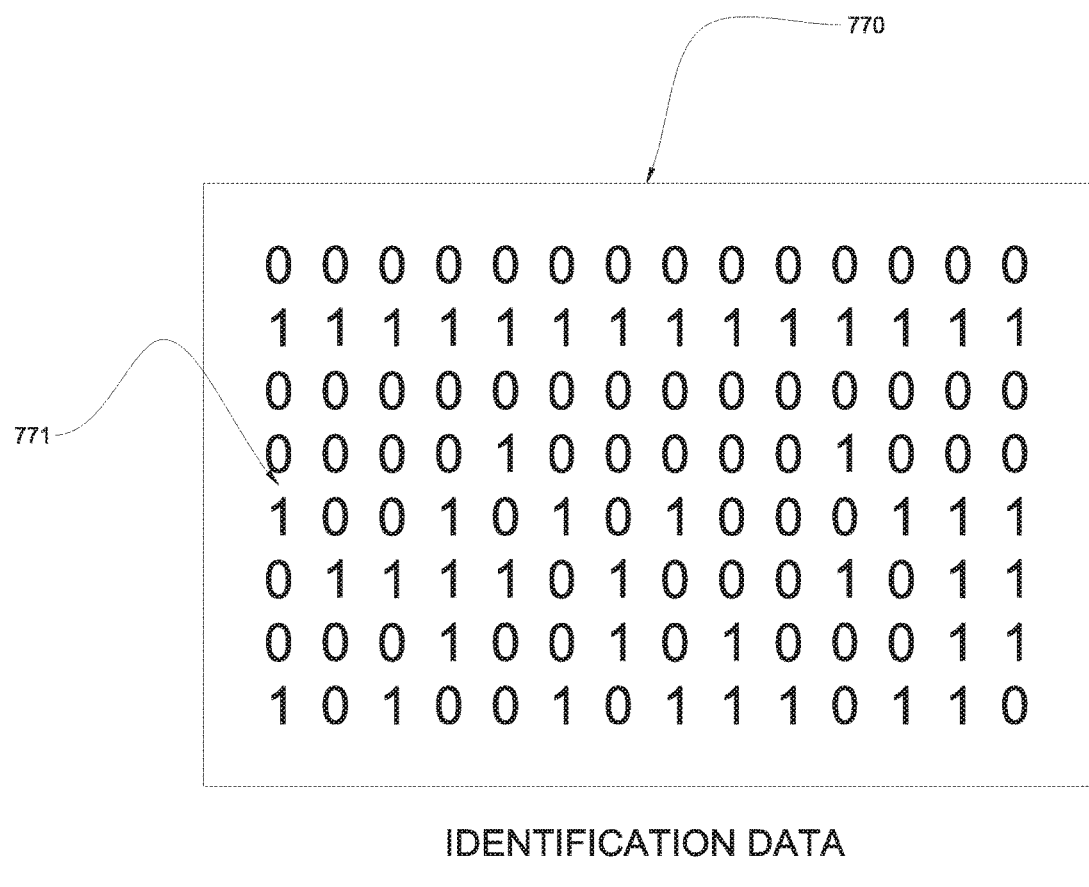
FIG. 12 shows a schematic of the memory block of a contactless smart card for use in an equipment isolation system in accordance with embodiments of the present invention.

Operators are provided with smart cards 770 with stored identification data appropriate to their duties. This identification data is issued by the plant control system 260 and stored in an operator database 261 with a record for each operator on site in a pre-configuration step. Such identification data is also stored in memory blocks 771 of the smart card as schematically shown in FIG. 12 using a conventional smart card programming process. The programming process may issue different operators with unique identification data which may act as an access card allowing the operator access to the site; and then both as authority to access the remote isolation system and isolation permit to work on specific tasks on the conveyor belt system 20 or be present within an area of works on the conveyor belt system 20. Multiple isolation permits may be issued and corresponding data stored on the smart cards 770.

Figure 10:
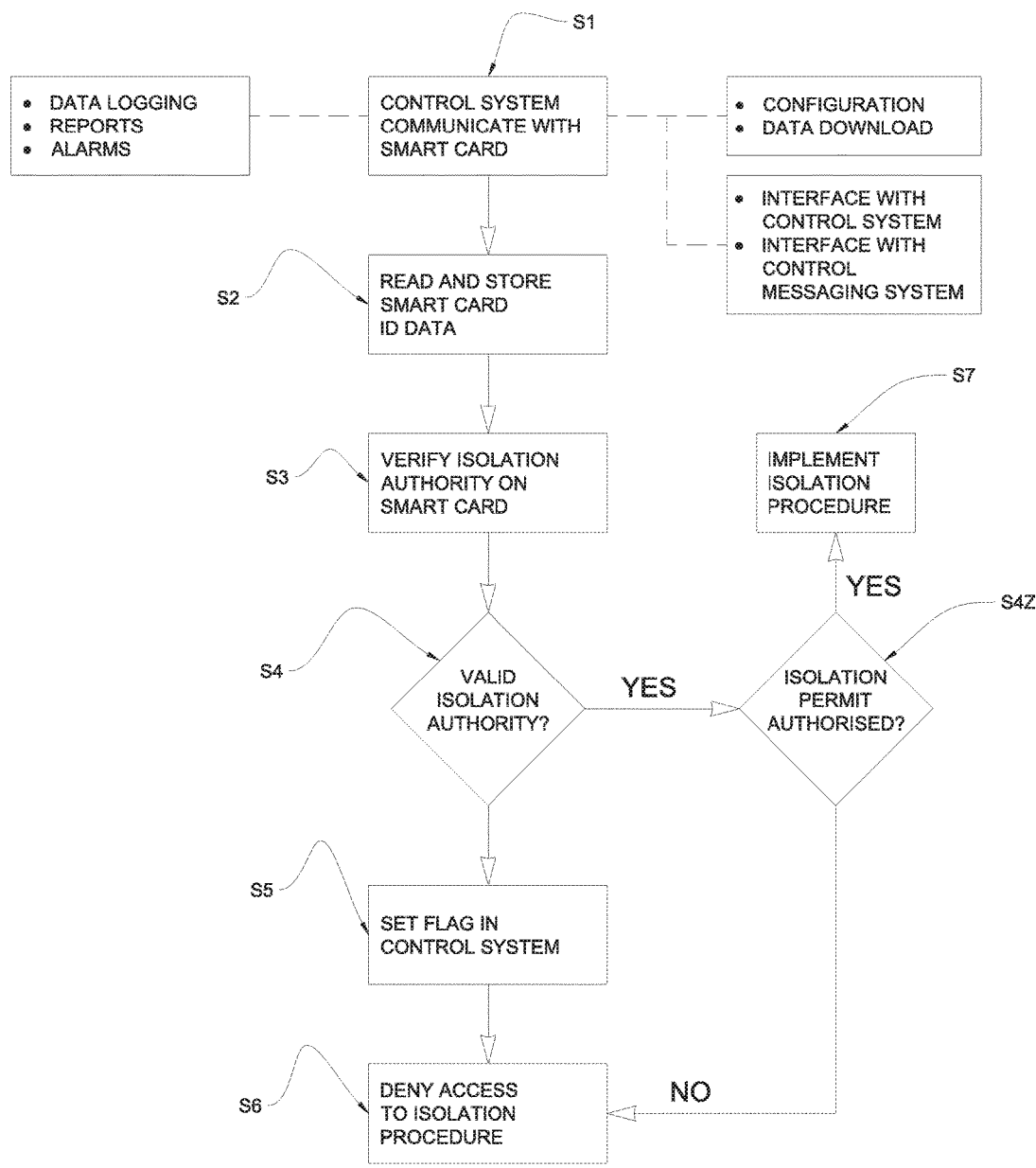
FIG. 10 shows a first logic flow diagram for operation of an equipment isolation system as schematised in FIG. 1 and using the control panel shown in FIG. 2.
Figure 13:
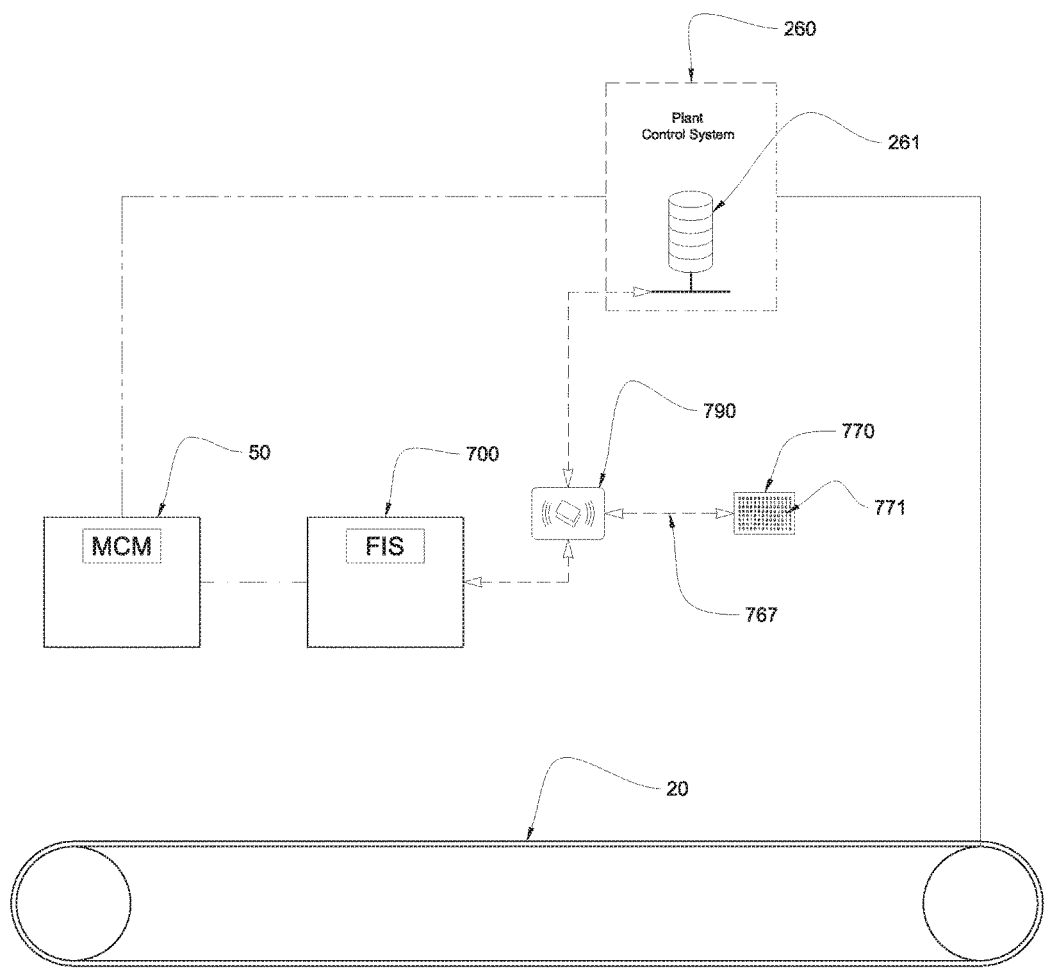
FIG. 13 shows a schematic showing the first embodiment of identification device and its relationship to other components of the equipment isolation system schematised in FIG. 1.

As schematically shown in FIGS. 10 and 13 at step S1, smart card reader 790 communicates wirelessly (at radio frequency along communication line 767) with the operator's contactless smart card 770. Although isolation is the focus for such communication in the flowchart, smart cards 770 may be interfaced with smart card reader 790 and control system 260 for other purposes, for example to configure them, download data to them, retrieve logging data from them, interface with other plant components and so on. Smart cards 770 may, through use of appropriate communications equipment included in the smart card system, store and transmit plant and other relevant data (including operator tracking for example through GPS tracking (useful for ensuring that operators only access areas they are authorised to work in), reports, alarms and so on). Interfacing with plant control system 260 including its messaging systems (by text, voice message or otherwise) is also possible. This functionality is indicated in FIG. 10.

At step S2, smart card reader 790 reads its stored identification data from memory blocks 771 of smart card 770. The identification data is recorded and sent, at step S3, to plant control system 260 for smart card 770 validation through comparison, at step S4, with stored isolation authorities data in operator database 261 regarding isolation of the conveyor belt system 20. Operator name, date and time of attempted access are recorded in the operator database 261.

Even if smart card 770 is validated, plant control system 260 performs a check to authorise permits to isolate conveyor belt system 20 at step S4Z.

In either case, if the operator's input and stored identification data do not match showing a lack of validity of smart card 770 or a lack of authorisation through isolation permit, the plant control system 260 flags this situation at either step S5 or step S6 and issues an alarm to the CRO 42 for appropriate response. At step S6, the operator is denied access to the isolation procedure through the control panel 700 and an alarm is generated at CCR 40. Various further actions could be taken. For example, the plant control system 260 may send a message or signal to the operator's supervisor initiating corrective action enabling isolation to proceed in a safe and cost effective manner.

Figure 3:
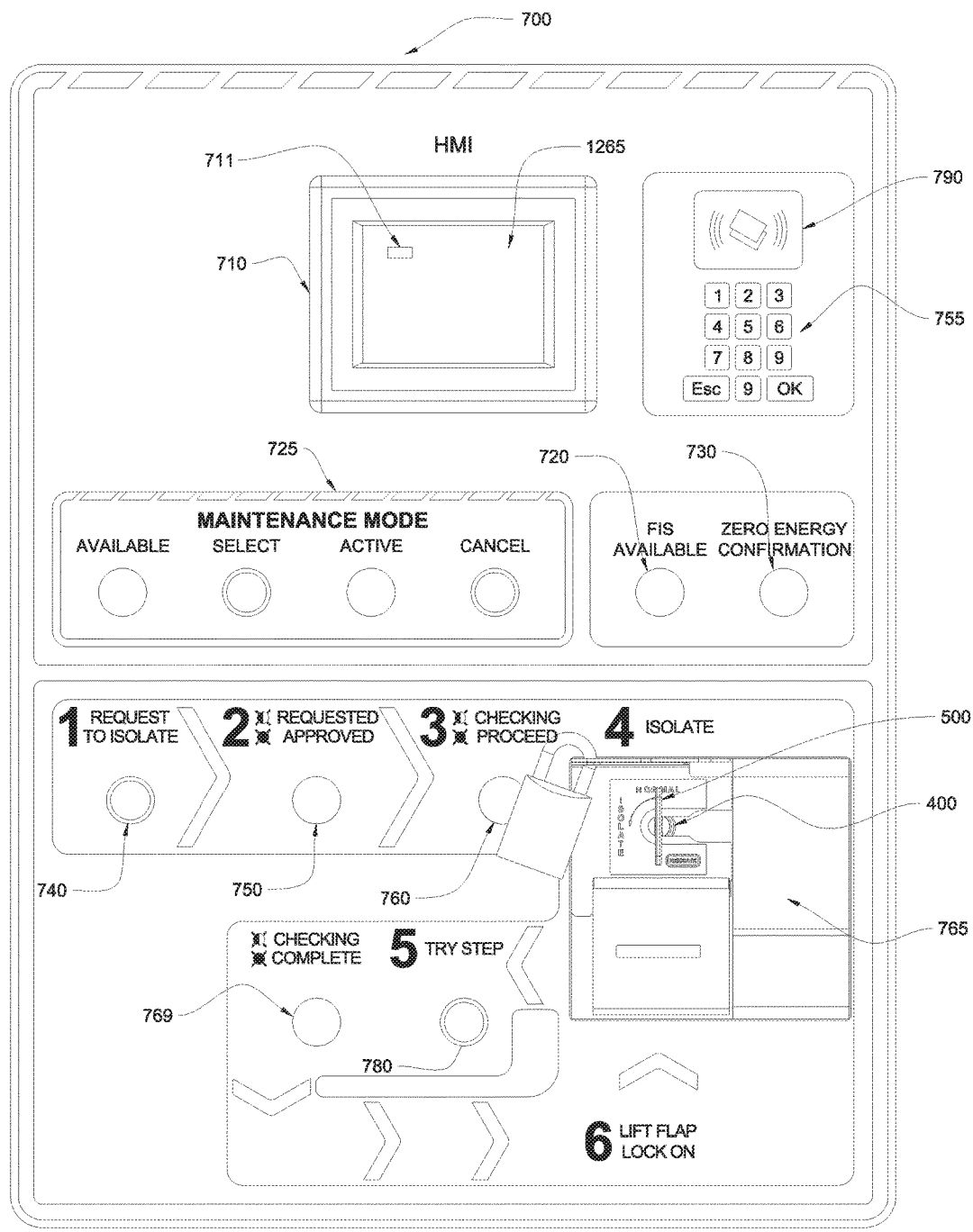
FIG. 3 shows a schematic of a further embodiment of control panel for a fixed equipment isolation station useful for the equipment isolation system schematised in FIG. 1.
Figure 14:
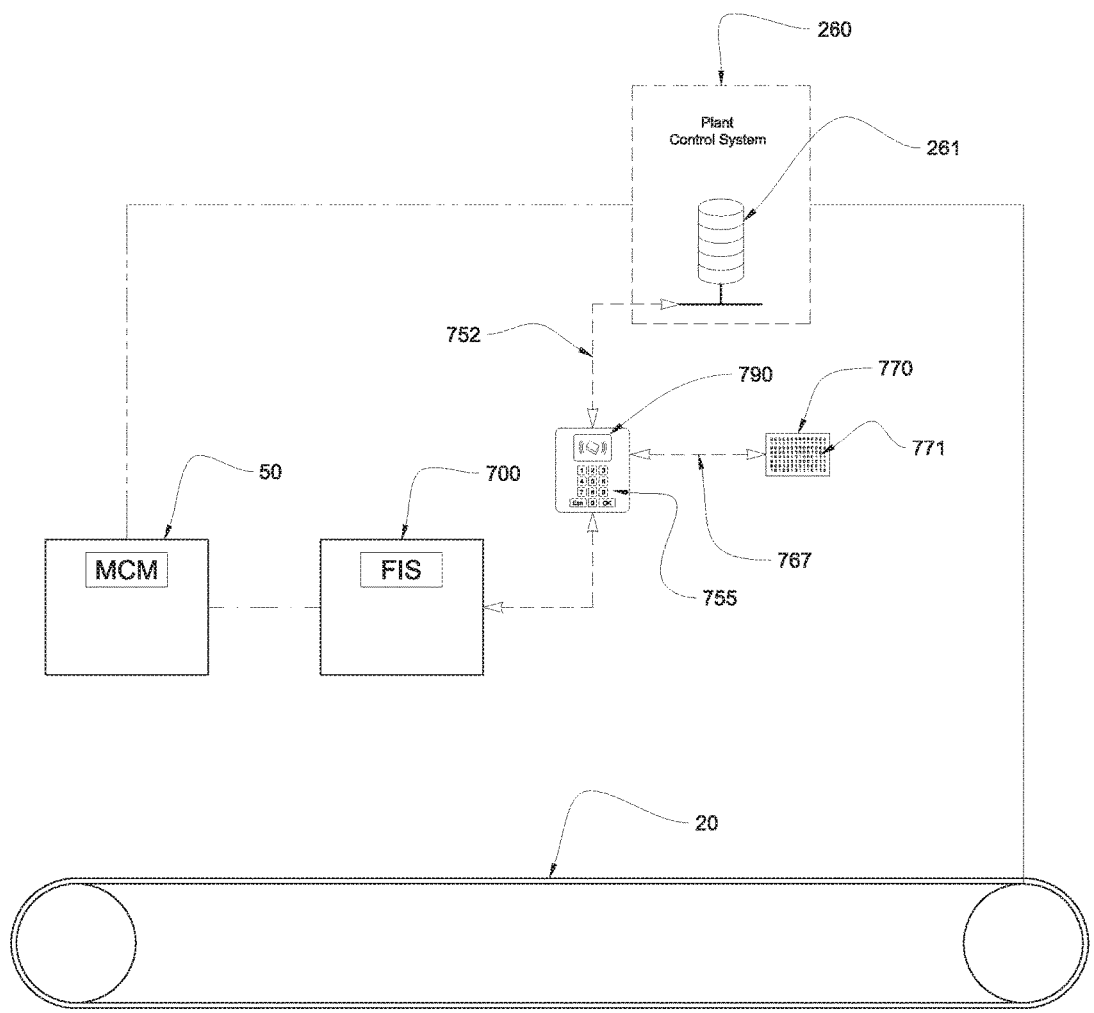
FIG. 14 shows a schematic showing the second embodiment of identification device and its relationship to other components of the equipment isolation system schematised in FIG. 1.

Further security can be achieved by using a control panel 700 (as shown in FIG. 3) including an additional identification device 755 taking the form of a keypad as schematically shown in FIGS. 3 and 14. In such a case, an operator seeking to isolate conveyor belt system 20 brings operator identification means in the form of smart card 770 into communication with smart card reader 790 which confirms that the smart card is valid at steps S1 to S4 as previously described. If not, the operator can take no further isolation action at control panel 700 and this situation may be flagged on screen 1265 and at the CCR 40 for the CRO 42 to take appropriate response action in steps S5 and S6 as described above.

Figure 11:
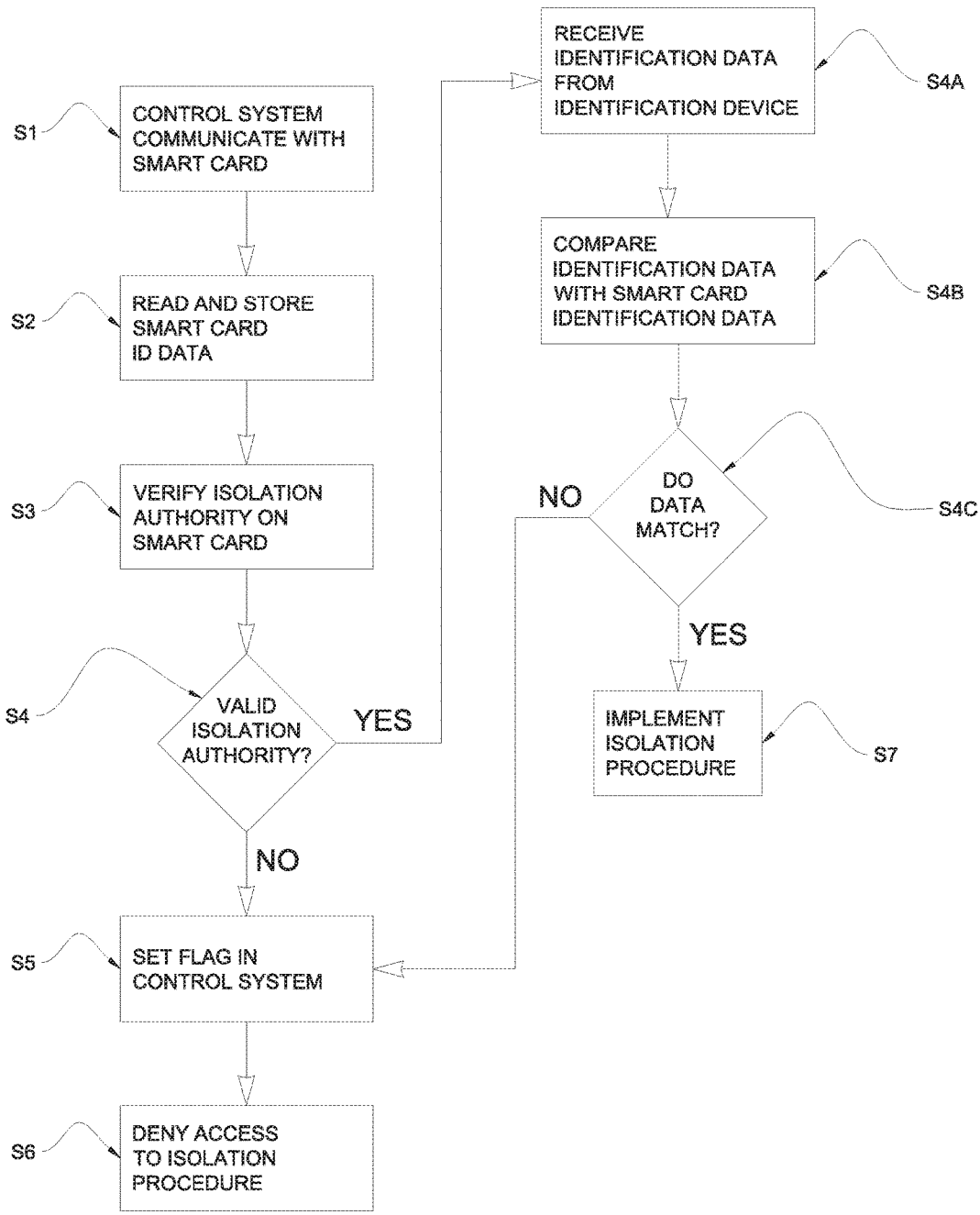
FIG. 11 shows a second logic flow diagram for operation of an equipment isolation system as schematised in FIG. 1 and using the control panel shown in FIG. 3.

As will be evident from FIGS. 11 and 14, if the operator's smart card 770 is valid, the operator must still input identification data (a Personal Identification Code (PIC)) to keypad 755 before proceeding further to use remote isolation system 10. A corresponding signal is wirelessly sent through communication line 752 to plant control system 260 which receives the identification data signal at step S4A for verification and processing, through comparison with stored isolation authorities on operator database 261 at steps S4B and S4C. If the input and stored identification data do not match, the plant control system 260 flags this situation at step S5 and issues an alarm to the CRO 42 for appropriate response. At step S6, the operator is denied access to the isolation system through the control panel 700.

If the input and stored operator identification data successfully match, showing the operator has the necessary permit for standard isolation of the conveyor belt system 20, the operator may proceed to implement the isolation procedure for the conveyor belt system 20 at step S7 by using the control panel 700 at the equipment isolation station 12 to effect the isolation. Control panels 700 are shown in FIGS. 2 and 3.

The control panel 700 also includes:

Indicator light 720 showing whether or not the equipment isolation station (RIS) 12 or 14 is available for isolation;

Indicator light block 725 showing whether or not exclusive or maintenance mode for the remote isolation system is available or active as described in Australian Provisional Patent Application No. 2015902557 the contents of which are hereby incorporated herein by way of reference; and respective "select" and "cancel" buttons for initiating or terminating the maintenance mode;

Indicator light 730 to provide zero energy confirmation when sensors, such as at least the load voltage monitor relay described above for contacts 31 and preferably conveyor belt 21 movement sensors as well, indicate zero hazardous energy in the conveyor belt system 20 (i.e. a zero energy indication is achieved when the culmination of all energy sources being monitored confirms that there is no stored or latent energy (whether potential, or electrical etc) remaining in the system desired to be isolated);

Request to isolate button 740 which is activated by an operator (and which illuminates when pressed) to request isolation and "request approved" indicator light 750 which also illuminates to provide status information to said operator;

Indicator light block 760 for indicating that control system checking is taking place subsequent to an isolation request being instigated; and Indicator light block 769 for showing whether or not the isolation is complete following control system checking.

Control panel 700 also includes an equipment isolation switch 765 which prevents completion of the isolation process (i.e. by way of locking with an operators padlock which may be affixed to a hasp attached to the switch 765) until the correct remote isolation request procedure, for example as described in granted Australian Patent No. 2010310881 or Australian Provisional Patent Application No. 2015902554 has been completed.

If the operator demonstrates authority to isolate conveyor belt system 20 with the use of the smart card system as above described, the conveyor belt system 20 is isolated by a procedure involving the following sequence of steps:

1) Operator request by pressing button 711 on screen 1265 of HMI 710 of equipment isolation station 12 for plant control system 260 to approve isolation of all or part of conveyor belt system 20 including conveyor 21 and head pulley drive motor 22;
2) Isolation approved if operator request meets permissives for isolation, for example as described in granted Australian Patent No. 2010310881;
3) Isolation automatically implemented by the control system 260;
4) Try start step being invoked to check that the isolation is effective, which involves checking that electrical contacts 31 for the conveyor belt system 20 are in isolated position with no voltage downstream of electrical contacts 31 as continuously monitored by the above described voltage monitor relay (and desirably conveyor belt 21 movement sensors as well); an attempt to re-start the conveyor belt system 20 using a try step button 780 or an automated process; and checking that there is no re-energisation of conveyor belt system 20 (which may involve monitoring as described in the Applicant's Australian Provisional Patent Application No. 2015902556, the contents of which are incorporated herein by reference); and
5) Lockout at a control panel 700 of equipment isolation station 12 and/or 14 if the try start is unsuccessful (as required).

In particular, a correct remote isolation process requires a try start step to be completed by an operator by activation of try step button 780 before any manual lock out is possible. The equipment isolation switch 765 is designed to prevent any such manual lock out before the correct isolation process has been completed.

Equipment isolation switch 765 includes an equipment isolation switch 400 operable by turning key 500 between a first "NORMAL" position in which the head pulley drive motor 22 for conveyor 21 is electrically energised (i.e. not isolated) and a second "ISOLATE" position in which the drive motor 22 is electrically isolated and thus without power facilitating any maintenance works which may be required. However, turning key 500 from the NORMAL to ISOLATE positions is a necessary but not sufficient condition for the equipment isolation system to properly isolate conveyor belt 21 and its drive motor 22. The switch 400 must be locked out. This has been done to date, as described above, by a manual lock out procedure using a personal lock in the form of a padlock.

It will be understood that other isolation switch equipment could be used. An alternative isolation switch assembly, including a securing means to maintain key 500 in co-operation with isolation switch 400 as described in the Applicant's Australian Provisional Patent Application No. 2015902554 filed 30 Jun. 2015, the contents of which are hereby incorporated herein by way of reference, could also be used.

In an alternative embodiment, using the same control panel 700, the hasp for locking out isolation switch 400 would be substituted by an electro-mechanical lock operable (through lock out or lock off) on presentation of valid smart card(s) 770 to smart card reader 790 during the isolation procedure. This minimises risk of misuse of the prior mechanical locks which has occasionally been an issue.

Referring now to FIGS. 4 to 9, one or more mobile isolation device(s) 120, rather than a fixed equipment isolation station, may be used for accessing the equipment isolation system. Such mobile isolation device 120 is similar to that described in the Applicant's Australian Provisional Patent Application No. 2015902562, the contents of which have previously included herein by reference, and which has advantages of portability and flexibility to handle a number of isolation scenarios in a number of plant settings.

It should be noted that for certain specific applications, the mobile isolation device could take the form of a re-configured smart phone or other smart device in which telephonic function (or Voice Over Internal Protocol (VOIP)) is integrated for communications with CRO 42. Control panel 124 is used for implementing the Applicant's remote isolation system 10 and includes an antenna 126 for implementing wireless communications, in the above described manner, with plant control system 260 and master controller 50. Wireless communications are line of sight with additional repeaters used if necessary to maintain satisfactory communications integrity. Plant transport vehicles may also include such repeaters.

Mobile device 120 is powered by a rechargeable battery (not shown). The mobile isolation device 120 is manually portable having dimensions (provided as an example only) of 230 mm×370 mm.

Figure 4:
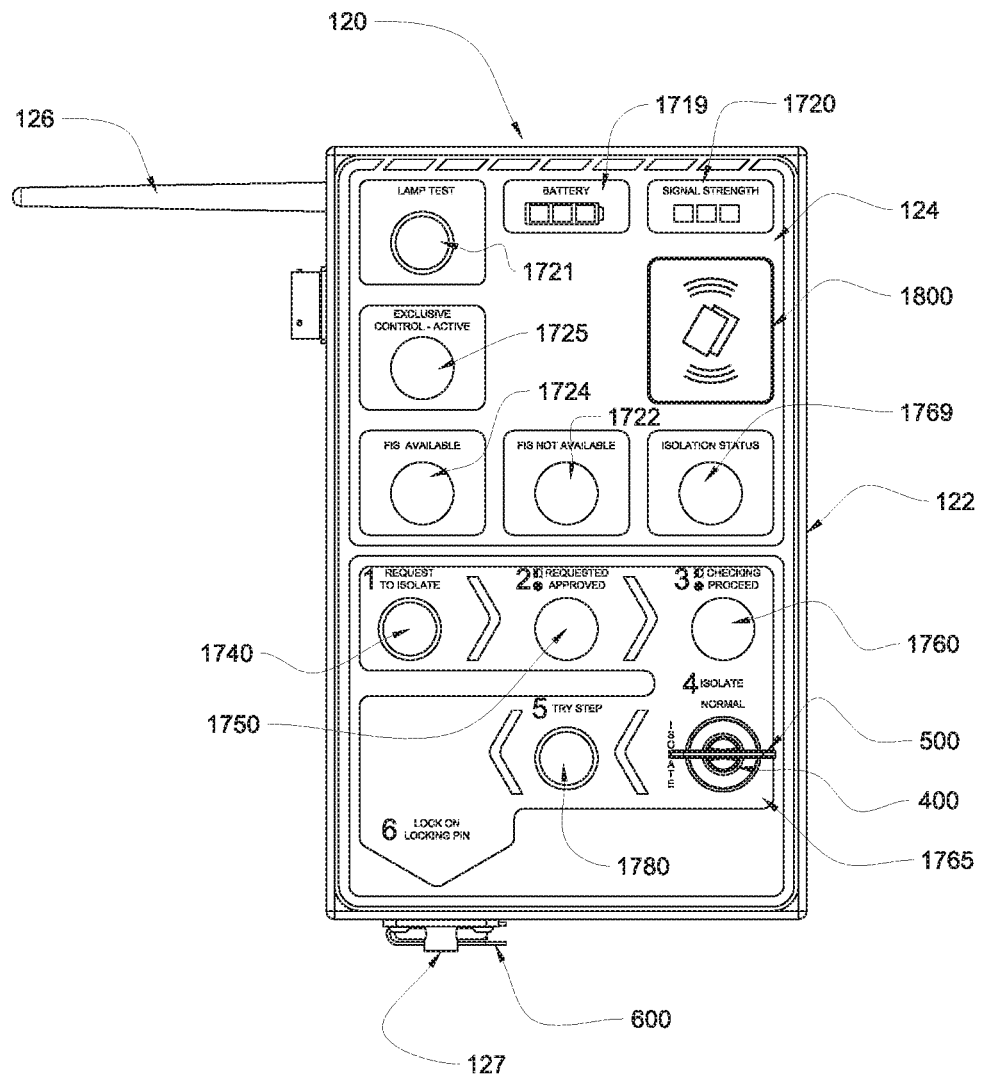
FIG. 4 shows a front view of a mobile isolation device for use in the equipment isolation system schematised in FIG. 1, the mobile isolation device being in isolated condition.
Figure 5:
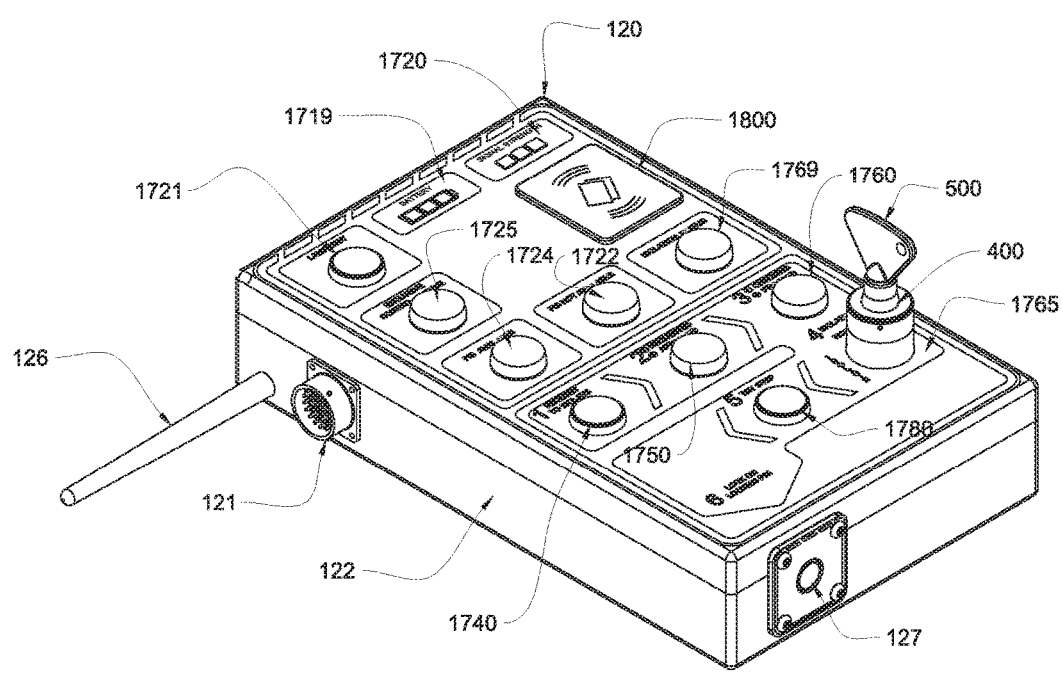
FIG. 5 shows a first side perspective view of the mobile isolation device of FIG. 4 in normal or "resting" position.
Figure 6:
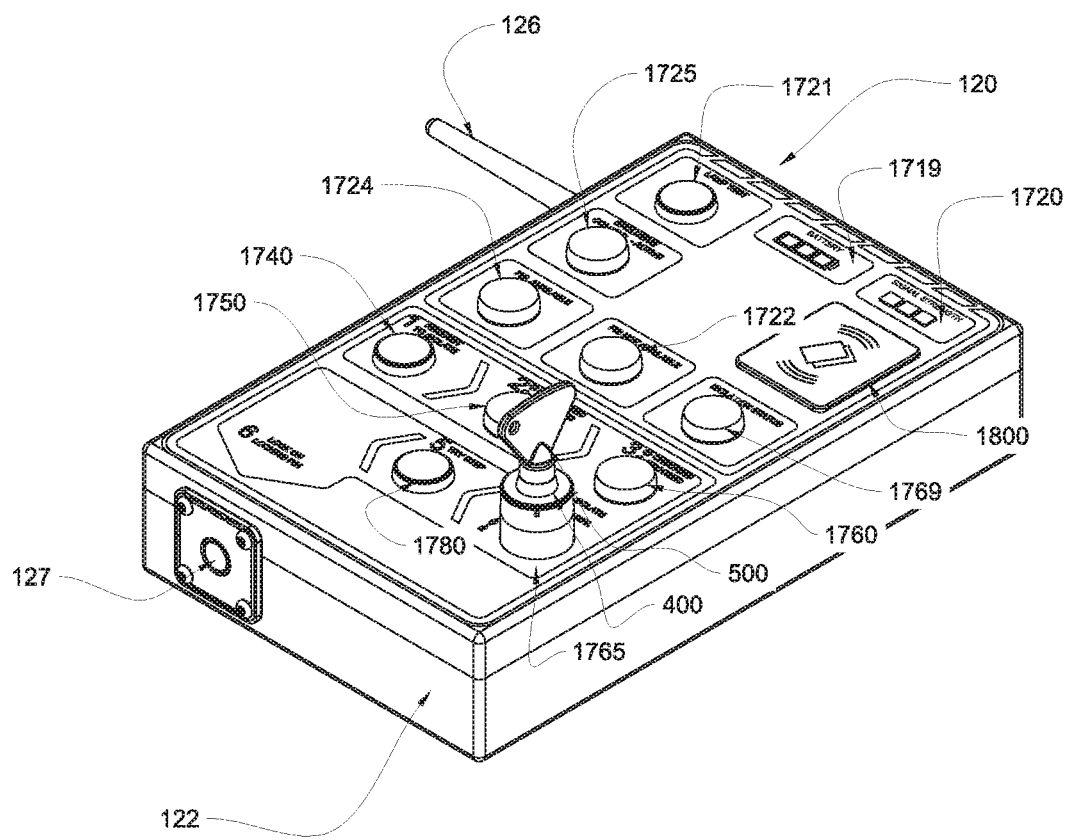
FIG. 6 shows a second side perspective view of the mobile isolation device of FIGS. 4 and 5.

As can be seen in FIG. 4, the control panel 124 includes:
Battery storage indicator light block 1719;
Wireless signal strength indicator light block 1720;
Lamp test request button 1721;
Indicator lights 1722 and 1724 showing whether or not the mobile isolation device 120 is available for isolation;
Exclusive control selection button 1725 for selecting exclusive control and illuminable to indicate whether or not exclusive control is active (exclusive control where conveyor belt system 20 isolation is controlled exclusively from mobile isolation device 120 is described below);
Request to isolate button 1740 which is activated by an operator (and which illuminates when pressed) to request isolation;
Request approved indicator light 1750 which illuminates to provide approved status information to said operator;
Indicator light block 1760 for indicating checking of the isolation procedure;
Indicator light block 1769 for showing whether or not the isolation process is complete following control system checking;
Try step button 1780 for requesting a try step in which a restart of conveyor belt system 20 is attempted (and which illuminates when pressed); and
Graphics (in the form of arrows and text) illustrating the sequence of steps to be followed in the required isolation procedure.

Mobile isolation device 120 also enables the operator to request isolation of equipment within conveyor belt system 20 following verification of operator authority to isolate using a smart card reader 1800 incorporated in control panel 124. This smart card reader 1800 operates in the same way as smart card reader 790 described above and the operator follows the same procedure to isolate as schematised in FIGS. 10 and 13, control panel 700 being replaced with control panel 124 and smart card reader 790 being replaced with smart card reader 1800.

It will be understood that the mobile isolation device 120 could be provided with a touch screen for issuing commands and providing isolation status and plant status information. Any such touch screen for the mobile device 120 could conveniently be provided as a low power consumption LCD screen. However, where the isolation device is likely to be subjected to demanding service where wear and damage is almost inevitable, the touch screen may be omitted.

Mobile isolation device 120 may also be provided with alarms in the form of an audible alarm and/or alarm lights as required.

Control panel 124 also includes an equipment isolation switch block 1765 and isolation switch as described above for control panel 700. It is again noted that a correct remote isolation procedure request requires a try start step to be completed by an operator by activation of try step button 1780 before any manual lock out is possible.

Figure 7:
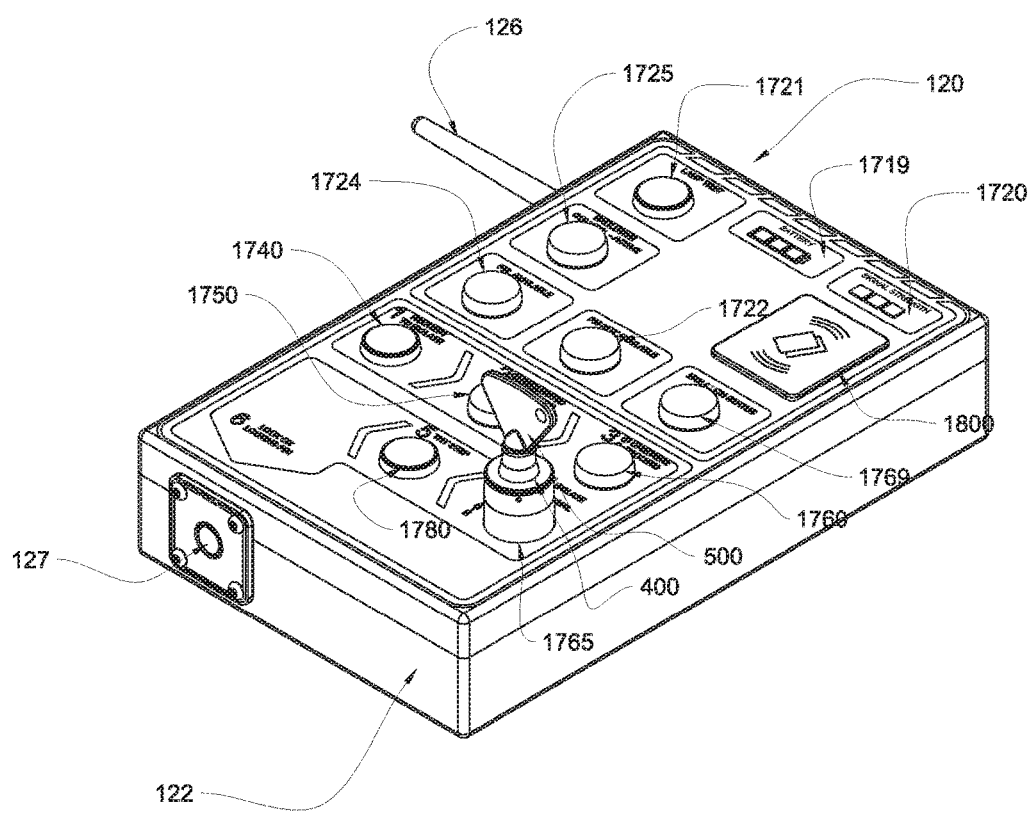
FIG. 7 shows a side perspective view of the mobile isolation device of FIGS. 4 to 6 with isolation switch turned to the ISOLATE position prior to lockout.
Figure 8:
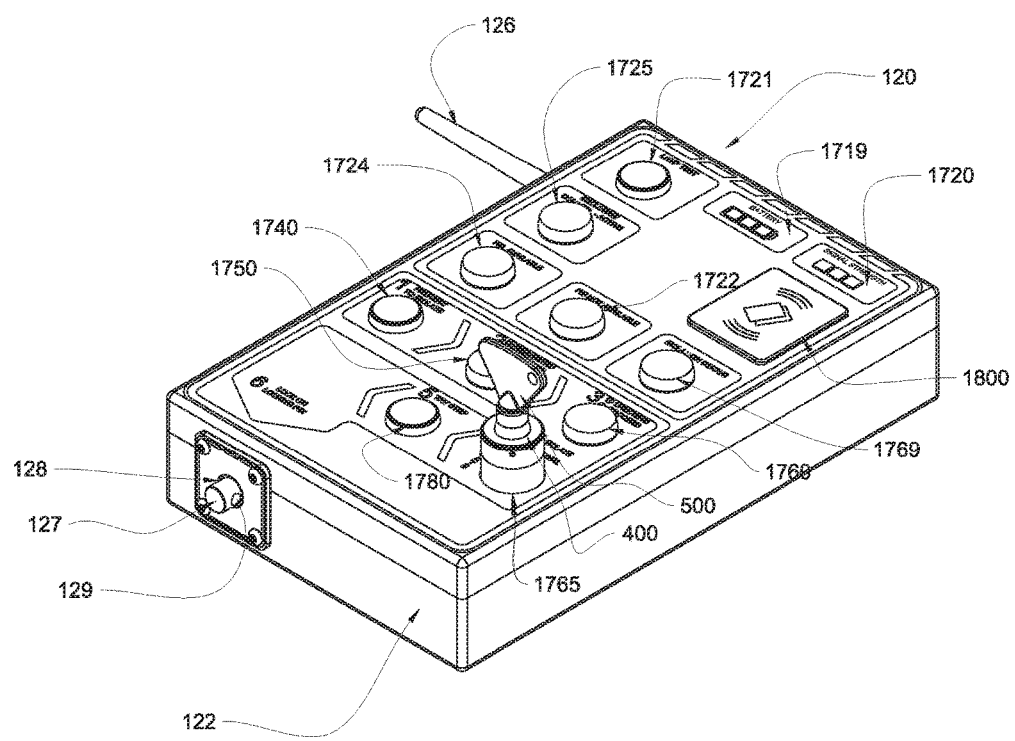
FIG. 8 shows a side perspective view of the mobile isolation device of FIGS. 4 to 7 with isolation lockout point provided on completion of an isolation procedure.

Equipment isolation switch 400 is again operable by turning the key 500 between a first "NORMAL" position in which the drive motor 22 for the conveyor 21 is electrically energised (i.e. not isolated) and a second "ISOLATE" position in which the drive motor 22 is electrically isolated and thus without power thereby facilitating any maintenance works which may be required. This condition is shown in FIG. 7.

Figure 9:
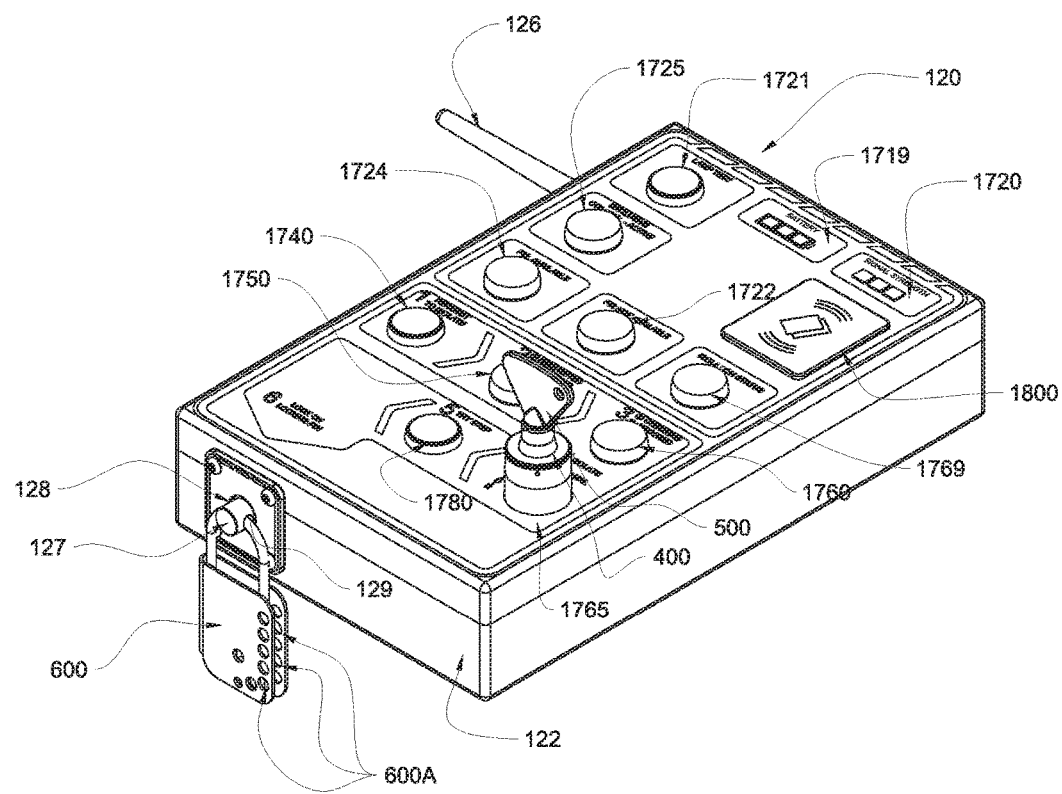
FIG. 9 shows a side perspective view of the mobile isolation device of FIGS. 4 to 8 in isolated and locked out condition.

By following the correct remote isolation procedure, an engaging means in the form of an isolation lockout point is provided for the operator at which they can apply a hasp 600 and personal lock. The isolation lockout point is provided by an electrically driven extension of sliding retractable pin 127—normally located within, and so concealed (though protected) by, a socket 128 of mobile isolation device console 122—at the conclusion of the isolation procedure. A small electric motor (not shown) is provided for this purpose. The isolation lockout point is formed by an aperture 129 extending through a diameter of pin 127 and hasp 600 may readily be applied to this lockout point as shown in FIGS. 4 and 9. Other operators may also need to apply personal locks to the hasp 600 and apertures 600A allow for this. Lockout by an operator at the lock out point provided by pin 127 ensures the isolation switch 400 is unable to be returned to a NORMAL condition without certain pre-defined steps being followed. Lockout by an operator at the lock out point provided by pin 127 ensures the isolation switch 400 is unable to be returned to a NORMAL condition without certain pre-defined steps prescribed by the isolation process being followed.

Again, and similarly as described with reference to control panel 700, in an alternative embodiment, using the same control panel 124, the hasp 600 for locking out isolation switch 400 could be substituted by an electro-mechanical lock operable (through lock out or lock off) on presentation of valid smart card(s) 770 to smart card reader 1800 during the isolation procedure. This minimises risk of misuse of the prior mechanical locks which has occasionally been an issue.

The equipment isolation switch 400 is only operable when the key 500 is engaged with it. Equally, the key 500 must be removed from the isolation switch 400 when deactivation of the equipment isolation switch 400 is required. Control system or authorised personnel approval would be required prior to any such removal which, even then, is only permitted when the isolation switch 400 is in the NORMAL condition. Importantly, key removal is not permitted without additional validation steps if the key switch 400 is in the ISOLATE condition. Deactivation would typically require other tasks to be completed before a remote isolation system is safely and completely removed from service and the equipment item in question can be re-energised for normal operation. Completion of such tasks may involve the use of other keys, preferably rendered operable using the key exchange unit described in the Applicant's Australian Provisional Patent Application No. 2015902557, the contents of which have previously been incorporated herein by reference.

It will be understood that communications between the mobile isolation device 120 and plant control system 260 are sent through the wireless communications network and antenna 126 to mobile isolation device 120. Hence the operator request is sent wirelessly, as is the control system approval.

In an alternative embodiment, mobile isolation device 120 could omit a card reader in preference for a keypad for inputting a personal identification code (PIC) and/or a biometric identification device in the form of a fingerprint pad and processor of conventional form. Operator identity would then be verified by comparing by both the operator's PIC as keyed into the keypad and fingerprint with PICs and fingerprints for personnel authorised to isolate conveyor belt system 20 as stored in operator database 261 of plant control system 260. To that end, the operator's fingerprint data would be wirelessly sent to plant control system 260 for processing and comparison. If input and stored fingerprint data match, the operator would proceed to log an isolation request and the isolation procedure proceeds, essentially as described above, using the mobile isolation device 120. If not, the control system 260 would flag this situation and issues an alarm to the CRO 42 for appropriate response. The operator would also be denied access to the isolation procedure through mobile isolation device 120. The logic flow is very similar to that described with respect to FIG. 11.

A standard isolation mode, with appropriate operator identification data stored on smart cards 770, has been described above. It will however be understood that the control system may provide for selection of one of a plurality of available isolation modes as described in the Applicant's Australian Provisional Patent Application No. 2015902558, the contents of which have previously been incorporated herein by reference. Such isolation modes may also be conveniently enabled through the wireless communications network.

Figure 15:
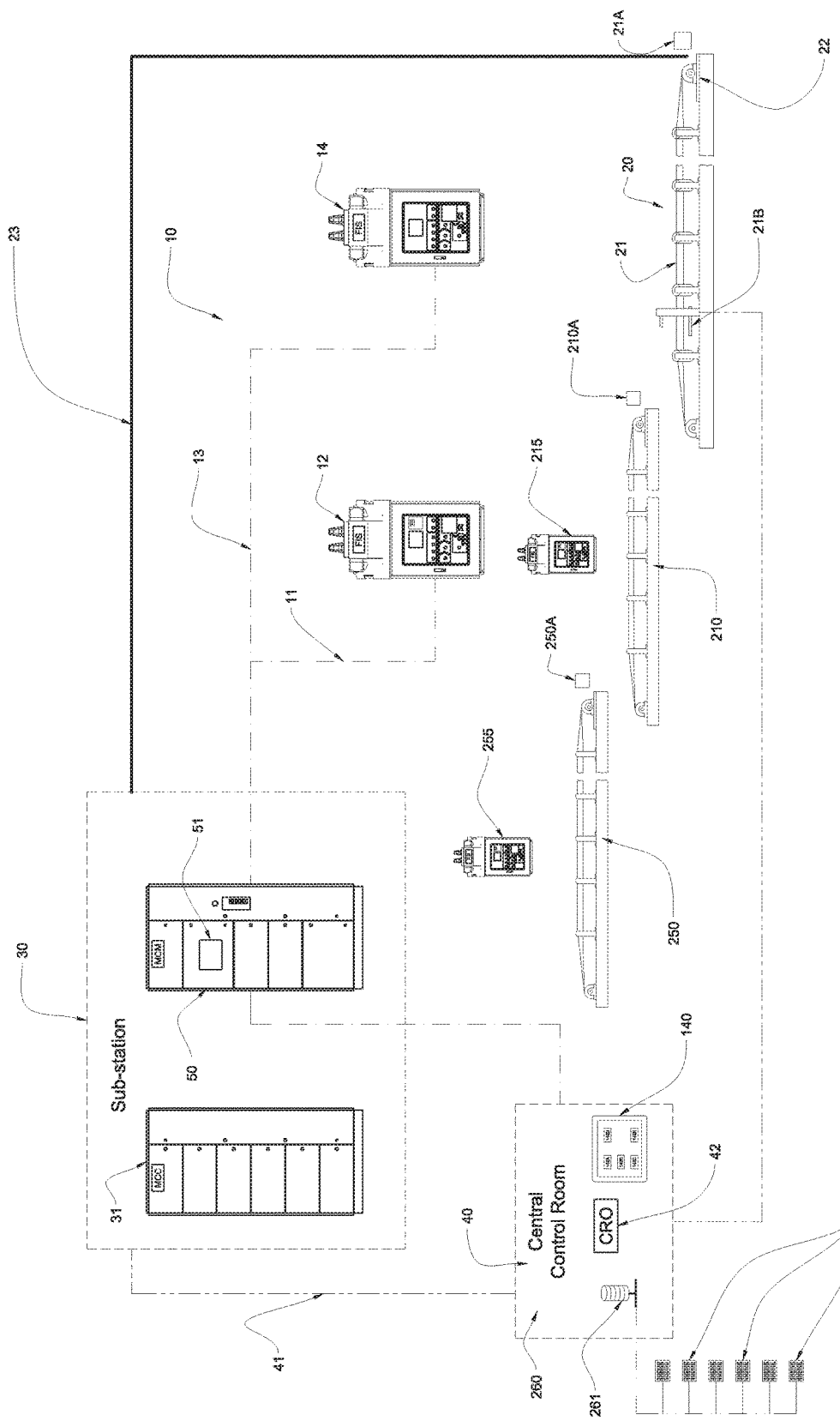
FIG. 15 shows an equipment isolation system as applied to a conveyor belt system configured in accordance with a further embodiment of the present invention.

Referring to FIGS. 15 and 16, the remote isolation system 10 may be used in a configurable isolation mode (selected from a plurality of available isolation modes at control panel 700) in which the plant control system 260 may allow for a number of options for isolating a selected sub-set of equipment items from a set of equipment items together comprising the conveyor belt system 20 which forms part of a material handling plant. These equipment items may include conveyor belts 21, 210 and 250, the respective conveyor belt braking systems 21A and 210A, any belt clamps (not shown) which may be arranged with respect to the conveyor belts, and shuttle locking pins 250A. Other components are of course also included within conveyor belt system 20 but do not require detailed description for present purposes.

In this case, the CRO 42 configures an isolation for conveyor belt system 20 at CCR 40 by selection from a suite of configuration options displayed on the screen 142 of control room panel 140. Each configuration option is selectable by a selecting means involving activation of a button corresponding to the desired isolation configuration option. As shown in FIG. 16: Button 142A is provided to isolate conveyor 21 (leaving braking system 21A energised); Button 142B is provided to isolate conveyor 21 and its braking system 21A; Button 142C is provided to isolate conveyor 250; Button 142D is provided to isolate conveyor 250 and its shuttle locking pins 250A; and Button 142E enables all these conveyor belt system items to be selected for isolation.

If the CRO (or isolation permit officer) 42 selects all the required equipment in conveyor belt system 20 for isolation by pressing button 142E, for a shutdown planned some time in advance, members of a team of operators still need to attend equipment isolation stations 12 (or conveyor belt 21), 215 (for conveyor belt 210) and 255 (for conveyor belt 250) to complete isolation procedures using essentially the same isolation procedure for conveyor belt system 20 as described above.

A team of operators A, B, C, D and E are assigned to this task. Each operator A, B, C, D and E would be provided with a smart card 770 on which permit data is written from operator database 261 into memory blocks 771 of their smart cards using a conventional process. Tasks are assigned, and recorded through permit data on operator smart cards 770, in accordance with the following table, representing an extract from operator database 261 as updated for purposes of the conveyor belt system shutdown by supervising personnel during a preliminary planning process:

| Operator | Task |
| --- | --- |
| A | Isolate conveyor 21 only. |
| B | Isolate conveyor 210 only. |
| C | Isolate conveyor 250 only. |
| D | Isolation lock on for each of conveyors 21, 210 and 250. Perform mechanical work on each over days 1 and 2. |
| E | Isolation lock on for each of conveyors 21, 210 and 250. Perform mechanical work on each over days 1 to 3. |

The above described pre-configuration process provides the CRO (or isolation permit officer) 42 with flexibility and strict control over what operators A to F can and cannot do in respect of the specific conveyors 21, 210 and 250 and the surrounding work areas and at what times. The process also ensures that operators do not erroneously isolate incorrect conveyor belts or associated equipment or erroneously isolate too many equipment items at the same time. The operators can only perform work governed by the rules and data governing the isolation process as stored as operator identification data on their smart cards 770.

Operators A, B, C, D and E attend at equipment isolation stations 12, 215 and 255 respectively. They present their smart cards 770 for verification using the smart card reader 790 as described above. The data matches as described above and they complete isolation and lock out using the above described procedure. It will be understood that if any of operators A, B or C attend the incorrect equipment isolation station, they would be unable to complete isolation. However, operators D and E who have isolation permits for each conveyor belt 21, 210 and 250, and need to perform mechanical work on each, are authorised to confirm isolation by verifying their identity and isolation permits by locking on with their personal isolation locks (which could include electro-magnetic locks actuated by use of validated smart cards 770) at each relevant equipment isolation station prior to starting work. D and E are not permitted to start work without this step and disciplinary procedures would be implemented if this were to happen. Their smart cards 770 will not permit this to occur.

The isolation process, coupled with the nature of equipment isolation system 10, enables the operator team to perform their duties more quickly and with less risk of error than current, and typically manual, administrative systems concerning isolation will allow. Isolation process costs are similarly reduced.

By way of the present invention, preconfigured isolations can be loaded to specific smart cards or smart devices which can confirm that a permit is in place, what the isolation points are for a given task, and the timing and location of the isolation that is required.

Modifications and variations to the remote isolation system of the present invention may be apparent to the skilled reader of this disclosure. Such modifications and variations are deemed within the scope of the present invention. For example, whilst the remote isolation system has been described with reference to materials handling plant for a mining application, it may be used in a range of industrial and other applications including isolating rail system components in railway infrastructure as described in the Applicant's Australian Provisional Patent Application No. 2015902560, the contents of which are hereby incorporated herein by way of reference.

Furthermore, while the control panel 700 has primarily been described as including a Human Machine Interface (HMI) 710 with a touch screen 1265 and a series of buttons and lights (e.g. 740, 750, 760, 770, 780 etc) to enable an operator to request an isolation event, it should be noted that the control panel 700, and specifically the touch screen 1265, may be configured to provide greater control and more information about isolation system steps to an operator (or indeed full control and all information to do with the isolation system). That is, a more 'digitally' based input means (or indeed a totally digital system) may be arranged for operation instead of an analogue or part analogue system as described herein to enable control of the equipment isolation system according to the present invention. Such configuration would equally apply to control panel 124.

The invention claimed is:

1. An equipment isolation system for remotely isolating equipment in a plant comprising:
    equipment energisable by an energy source; and
    a control system for controlling and monitoring operation of said equipment and isolation of said equipment from said energy source to an isolated state by an operator,
    wherein said control system includes an identification device for an operator to provide operator identification data; and a processor for comparing said operator identification data with stored identification data for operators authorized to use the equipment isolation system wherein said control system is configured to enable use of the equipment isolation system by said operator only where the processor matches operator identification data provided to the identification device and said stored identification data;
    wherein said control system is configured to respond to an isolation demand input corresponding with one of a plurality of available equipment isolation modes, each of which enable automatic isolation of at least one of said plurality of equipment items from said energy source when authorized by the control system;
    wherein said plurality of available isolation modes includes an isolation mode to isolate said plurality of equipment items being a selected sub-set of equipment items from a set of equipment items which together comprise a plant or plant system;
    wherein said control system pre-configures said operator identification means with operator identification data prior to isolation, said operator identification data including data and rules governing isolation and operation of equipment items within said sub-set of equipment items;
    wherein said control system pre-configures a plurality of operator identification means with data and rules governing isolation and operation of equipment items within said sub-set of equipment items;
    wherein said control system pre-configures each operator identification means with different data and rules governing isolation and operation of equipment items within said sub-set of equipment items dependent on tasks that each operator has to perform during isolation.

2. An equipment isolation system as claimed in claim 1 wherein operator identification data is provided directly to the operator identification device or by bringing an operator identification means into communication with the operator identification device.

3. An equipment isolation system as claimed in claim 2 wherein said operator identification means includes a smart device.

4. An equipment isolation system as claimed in claim 3 wherein said smart device functions as a plant access means.

5. An equipment isolation system as claimed in claim 3 wherein said smart device includes communications equipment to store and transmit plant and operator data.

6. An equipment isolation system as claimed in claim 5 wherein said control system includes a plant control system which, when provided with operator identification data, checks and confirms an operator authority including an operator authority selected from the group consisting of an operator is authorized to effect an isolation, an operator has the correct isolation permit(s) and an operator has authority to access or leave a work area or plant site.

7. An equipment isolation system as claimed in claim 6 wherein said control system is configured to monitor and trigger an alert if said control system detects and flags that said operator has failed to de-isolate equipment when safe to do so.

8. An equipment isolation system as claimed in claim 6 wherein said work area or plant site has at least one access means operable by an operator identification means and said access means fails to operate if said control system flags that said operator has failed to de-isolate equipment when safe to do so.

9. An equipment isolation system as claimed in claim 1 wherein said operator identification data includes data and rules governing a specific isolation process.

10. An equipment isolation system as claimed in claim 9 wherein said rules include at least one isolation permit.

11. An equipment isolation system as claimed in claim 9 wherein operator identification data including at least one isolation permit determines operator authority to isolate specific equipment for specific tasks, in a specific order and/or at specific dates and times.

12. An equipment isolation system as claimed in claim 10 wherein said isolation permit data is tied to an operator's biometric data.

13. An equipment isolation system as claimed in claim 1 wherein said control system issues operator identification data from a database to an operator identification means.

14. An equipment isolation system as claimed in claim 13 wherein said operator identification means is pre-configured with operator identification data prior to isolation.

15. An equipment isolation system as claimed in claim 14 wherein said operator identification means is a smart device such as a smart card.

16. An equipment isolation system as claimed in claim 15 wherein the isolation demand input is provided by a selecting means for selecting said sub-set of equipment items for isolation.

17. An equipment isolation system as claimed in claim 16 wherein said selecting means enables said sub-set of equipment items to be isolated while leaving other equipment items operating.

18. An equipment isolation system as claimed in claim 1 wherein in case of incorrect or unauthorized identification data input to the identification device, the equipment isolation system flags this by issuing an alert signal.

19. An equipment isolation system as claimed in claim 1 including a remote isolation station for requesting equipment isolation, said remote isolation station including said operator identification device.

20. An equipment isolation system as claimed in claim 19 wherein said control system authorizes isolation on permissible request logged by an operator at said remote isolation station.

21. An equipment isolation system as claimed in claim 19 wherein said remote isolation station is mobile.

22. An equipment isolation system as claimed in claim 19 wherein said remote isolation station includes an equipment isolation switch for use in isolating equipment, said switch being movable between a first energised or de-isolated position in which said equipment item is energised by an energy source and a second isolated position in which the equipment is isolated from the energy source only where an operator has input authorized identification data in the form of data or rules governing a specific isolation process to said operator identification device.

23. An equipment isolation system as claimed in claim 22 wherein said switch is movable between said first and second positions only where a plurality of operators have input authorized identification data in the form of data or rules governing a specific isolation process to said operator identification device.

24. An equipment isolation system as claimed in claim 22 wherein said control system controls, and records details of, the operator(s) switch operation.

25. An equipment isolation system as claimed in claim 1 wherein the control system tracks operator location through monitoring a locating device on the operator identification means to ensure operators are working in the correct area corresponding with pre-configured operator identification data.

26. An equipment isolation system for remotely isolating equipment in a plant comprising:
   equipment energisable by an energy source; and
   a control system for controlling and monitoring operation of said equipment and isolation of said equipment from said energy source to an isolated state by an operator,
   wherein said control system includes an identification device for an operator to provide operator identification data; and a processor for comparing said operator identification data with stored identification data for operators authorized to use the equipment isolation system wherein said control system is configured to enable use of the equipment isolation system by said operator only where the processor matches operator identification data provided to the identification device and said stored identification data;
   wherein said control system is configured to respond to an isolation demand input corresponding with one of a plurality of available equipment isolation modes, each of which enable automatic isolation of at least one of said plurality of equipment items from said energy source when authorized by the control system;
   wherein said plurality of available isolation modes includes an isolation mode to isolate said plurality of equipment items being a selected sub-set of equipment items from a set of equipment items which together comprise a plant or plant system;
   wherein said control system pre-configures said operator identification means with operator identification data prior to isolation, said operator identification data including data and rules governing isolation and operation of equipment items within said sub-set of equipment items;
   wherein said control system pre-configures a plurality of operator identification means with data and rules governing isolation and operation of equipment items within said sub-set of equipment items;
   wherein said control system pre-configures each operator identification means with the same data and rules governing isolation and operation of equipment items within said sub-set of equipment items dependent on tasks that each operator has to perform during isolation.

27. An equipment isolation system as claimed in claim 26 wherein operator identification data is provided directly to an operator identification device.

28. An equipment isolation system as claimed in claim 26 wherein said rules include at least one isolation permit.

29. An equipment isolation system as claimed in claim 26 wherein said control system issues operator identification data from a database to an operator identification means.

30. An equipment isolation system as claimed in claim 26 wherein said operator identification means is a smart device such as a smart card.

31. An equipment isolation system as claimed in claim 26 wherein the isolation demand input is provided by a selecting means for selecting said sub-set of equipment items for isolation.

32. An equipment isolation system as claimed in claim 26 wherein in case of incorrect or unauthorised identification data input to the identification device, the equipment isolation system flags this by issuing an alert signal.

33. An equipment isolation system as claimed in claim 26 including a remote isolation station for requesting equipment isolation, said remote isolation station including said operator identification device.

34. An equipment isolation system as claimed in claim 26 wherein said control system tracks operator location through monitoring a locating device on the operator identification means to ensure operators are working in the correct area corresponding with pre-configured operator identification data.

* * * * *